US005639330A

United States Patent [19]

Otake et al.

[11] Patent Number: 5,639,330

[45] Date of Patent: Jun. 17, 1997

[54] METHOD OF MAKING AN IMAGE DISPLAY ELEMENT

[75] Inventors: Keiichi Otake, Takatsuki; Noboru Aikawa, Ibaraki; Atsunori Hosoki, Kyoto, all of Japan

[73] Assignee: Matsushita Electric Industrial Co., Ltd., Osaka-fu, Japan

[21] Appl. No.: 898,401

[22] Filed: Jun. 15, 1992

Related U.S. Application Data

[63] Continuation-in-part of Ser. No. 668,253, Mar. 12, 1991, abandoned.

[30] Foreign Application Priority Data

Mar. 14, 1990 [JP] Japan .................................. 2-63158
Mar. 28, 1990 [JP] Japan .................................. 2-79442

[51] Int. Cl.[6] ........................ B32B 31/04; B32B 31/26; H01J 29/70

[52] U.S. Cl. ........................ 156/239; 156/233; 156/235; 313/106; 313/422; 313/495

[58] Field of Search .................................. 156/235, 230, 156/239, 240, 87, 232; 427/68, 250, 69, 71, 122, 64, 165, 226, 227; 445/52; 313/106, 107, 422, 495

[56] References Cited

U.S. PATENT DOCUMENTS

| | | | |
|---|---|---|---|
| 2,281,558 | 5/1942 | Cross | 427/25 |
| 2,734,013 | 2/1956 | Myers | 156/241 X |
| 2,796,374 | 6/1957 | Donahue | 156/241 X |
| 2,828,435 | 3/1958 | Hoyt | 156/233 X |
| 2,878,411 | 3/1959 | Alvarez . | |
| 2,940,864 | 6/1960 | Watson | 427/25 |
| 3,166,418 | 1/1965 | Gundlach | 427/25 |
| 3,323,933 | 6/1967 | Barford et al. | 427/25 |
| 3,340,421 | 9/1967 | Watanabe et al. . | |
| 3,454,808 | 7/1969 | Takayanagi et al. | 313/466 |
| 3,475,639 | 10/1969 | Driffort et al. . | |
| 3,513,011 | 5/1970 | Miller | 427/71 |
| 3,703,401 | 11/1972 | Deal | 427/68 X |
| 3,808,048 | 4/1974 | Strik | 427/122 |
| 3,873,343 | 3/1975 | Misumi | 117/46 CA X |
| 3,910,806 | 10/1975 | Schwartz | 156/233 |
| 3,911,165 | 10/1975 | Kanai et al. | 313/466 |
| 4,025,661 | 5/1977 | Moscony | 427/68 X |
| 4,122,213 | 10/1978 | Ito et al. | 427/226 X |
| 4,221,990 | 9/1980 | Yamazaki et al. | 313/466 |
| 4,227,117 | 10/1980 | Watanabe et al. | 313/422 |
| 4,284,662 | 8/1981 | Matsuzaki | 427/68 X |
| 4,327,123 | 4/1982 | Levine | 427/64 X |
| 4,449,148 | 5/1984 | Inobara et al. . | |
| 4,451,846 | 5/1984 | Iyehara et al. . | |
| 4,623,820 | 11/1986 | Deal | 313/466 X |

(List continued on next page.)

FOREIGN PATENT DOCUMENTS

| | | | |
|---|---|---|---|
| 1281588 | 10/1968 | Germany . | |
| 2164174 | 7/1972 | Germany . | |
| 61-235471 | 10/1986 | Japan . | |
| 592860 | 10/1947 | United Kingdom | 427/71 |
| 1445454 | 8/1976 | United Kingdom | 427/122 |
| 2120840 | 12/1983 | United Kingdom . | |

*Primary Examiner*—David A. Simmons
*Assistant Examiner*—M. Curtis Mayes
*Attorney, Agent, or Firm*—Wenderoth, Lind & Ponack

[57] ABSTRACT

An image display element comprising a vacuum exterior container including a face plate and a back housing. A cathode is located within the vacuum exterior container. A control electrode controls electron beams projected from the cathode and a fluorescent layer generates light by projecting the electron beams, and a metal back layer provided on the fluorescent layer projects the light of fluorescent layer forward by the effect of specular gloss. A carbon layer is provided on the metal back layer to reduce the generation of backwardly scattered light. The metal back layer and carbon layer are provided by releasing from a supporter having mold release characteristics. The thickness of the metal back layer is determined in relation to the predetermined supply voltage such that the energy transmission factor of the reflected and dispersed electrons on the image display element is less than 30%.

18 Claims, 7 Drawing Sheets

U.S. PATENT DOCUMENTS 4,654,559 3/1987 Hinotani et al. .......... 313/422
4,729,907 3/1988 Deal .......... 426/64 X
4,794,040 12/1988 Ojima et al. .
4,880,857 11/1989 Mori et al. .
4,910,407 3/1990 Arakawa .......... 156/231 X
4,938,990 7/1990 Beckett .......... 427/25
4,954,366 9/1990 Pezzuco .......... 427/68 X
5,039,551 8/1991 Fujita .......... 427/64 X
5,087,517 2/1992 Sagawa .......... 428/329 X
5,141,461 8/1992 Nishimura .......... 156/87 X
5,151,604 9/1992 Kohda .......... 250/484.1
5,153,078 10/1992 Kojima .......... 428/690 rearward scattering efficiency (η) related to atom number (Z)

METHOD OF MAKING AN IMAGE DISPLAY ELEMENT

This application is a continuation-in-part application in connection with the U.S. patent application Ser. No. 07/668,253 filed on Mar. 12, 1991, which is abandoned.

BACKGROUND OF THE INVENTION

The present invention generally relates to a cathode-ray tube for displaying images by the application, upon the phosphor, of the electrons generated by the cathode within a vacuum cell, and more particularly, to an image display element using a cathode-ray tube which has a potential gradient within the vacuum cell.

Conventionally, although a Braun tube is mainly used as a display element for a color television image display, it is impossible to make the conventional Braun tube thinner, because the depth thereof is much greater than the size of the picture face.

As a plate-shaped display apparatus having the same light emitting principle as that of the Braun tube, the present applicant has proposed a novel display apparatus described in U.S. Pat. Nos. 4,451,846 and 4,449,148.

This is a plate type image display apparatus which forwards the electron beams from a plurality of linear thermal cathodes and causes the electron beams, controlled by an electron beam control electrode, to collide against the fluorescent screen so as to display letters, images and so on.

The plate type image display apparatus is constructed as shown in FIG. 1. In FIG. 1, a back electrode 51 is adapted to direct in the front face direction an electron beam 72 emitted from a plurality of linear cathodes shown by reference numerals 52*a* through 52*d*. An electron beam forwarding electrode 53 forwards the electrons from the linear thermal cathodes 52*a* through 52*d*. Through holes 62 are provided in the electrode 53 to let the electron beams 72 pass through them. A signal electrode 54, which is provided to apply the video signals, is composed of a plurality of control electrodes 64. Each control electrode 64 has through holes 63 therein to let the electron beams 72 pass through it. A first focusing electrode 55 and a second focusing electrode 56 are provided to focus the electron beams 72 in the horizontal and vertical directions.

Through holes 65 and 66 are provided in the electrodes 55 and 56 to let the electron beams 72 pass through them. A horizontal deflection electrode 68 deflects the electron beams in the right and left directions of the picture face, and is composed of one set comb type of electrodes 57*a* and 57*b*. The comb type of electrodes 57*a* and 57*b* constitute a slot 67 to let the electron beams 72 pass through between the mutual electrodes. A vertical deflection electrode 71 is provided to deflect the electrode beams 72 in the vertical direction of the picture face, and is composed of a set of comb type of electrodes 58*a* and 58*b*. The comb type of electrodes 58*a* and 58*b* constitute a slot 70 with their mutual electrodes to let the electrode beams 72 pass through them. A face plate (surface glass cell) 60 has a screen 73 composed of a three color phosphor layer of red, green, blue, a black stripe layer provided among them, and a metal back layer provided behind them on the inner face thereof.

A metallic plate 61 forming a back cell and the face plate 60 are joined to form a vacuum cell.

But in such a conventional display apparatus as described hereinabove, the rearward dispersed electrons generated by the electrons applied upon the metal back layer of the face plate 60 in the interior of the display element have a potential gradient, instead of being equipotential like in the conventional Braun tube, and are applied again upon the face plate, thus resulting in the largest factor for lowering the contrast ratio.

The above described factors will be described again hereinafter with reference to the drawings.

FIGS. 2A and 2B are views showing the internal construction of a Braun tube and the present image display element of the above described conventional embodiment.

In the drawings, the portions which are not necessary for illustration are omitted. In the case of the Braun tube, the electron beams 82 transmitted from the electron gun 81 are applied upon the metal back 84 positioned on the face 83. Approximately 80% of the electron beams pass through the metal back 84 and are incident on the fluorescent screen applied upon the face 83 so as to emit the light.

But the approximately 20% remaining electron beams 82 are reflected from the metal back 84 and become rearward dispersed electrons 85 and they are absorbed by a funnel 86 and a shadow mask. This is because the interior of the funnel 86 is equipotential. Although the approximately 20% of the electron beams 82 transmitted from the cathode within the electrode 88 become the rearward dispersed electrons 85 as in the Braun tube, in the case of the present image display element of the conventional embodiment, a high voltage of approximately 10 KV is applied upon the above described metal back 84 with the electrode 88 being provided with approximately 300V. The element has an electrode gradient therein. The rearward dispersed electrons 85 are applied again upon the metal back 84 on the face 83, and the fluorescent screen other than the plate where the electron beams 82 were primarily incident emits light, thus reducing the contrast ratio considerably. It is to be noted that the metal back 84 is composed of an aluminum layer.

SUMMARY OF THE INVENTION

Accordingly, the present invention has been developed with a view to substantially eliminating the above discussed drawbacks inherent in the prior art, and has for its essential object to provide an improved image display element.

Another important object of the present invention is to provide an improved image display element which is adapted to prevent the reduction in contrast ratio by the rearward dispersed electrons so as to display distinct images of good contrast.

In accomplishing these and other objects, according to the present invention, a carbon layer is formed on the metal back layer on the face plate. The thickness of the metal back layer is adjusted, and the transmission ratio of the transmission factor of the rearward dispersed electrons generated at the rush time of the electronic beams is restrained so as to be at 30% or lower.

The carbon layer is obtained by evaporating the silicone resin upon calcining the silicone resin at a temperature of about from 250° to 500° C. The temperature of 450° C. is more preferable for providing the carbon layer in a stable condition within the range of temperature of 400° to 500° C.

By the above described construction, an image display element is provided where the generation of the rearward dispersed electrons is reduced by approximately half and the light emission of the fluorescent screen at other than the location where the electron beams are primarily incident is also reduced by half, whereby the contrast ratio is improved by a factor of two.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
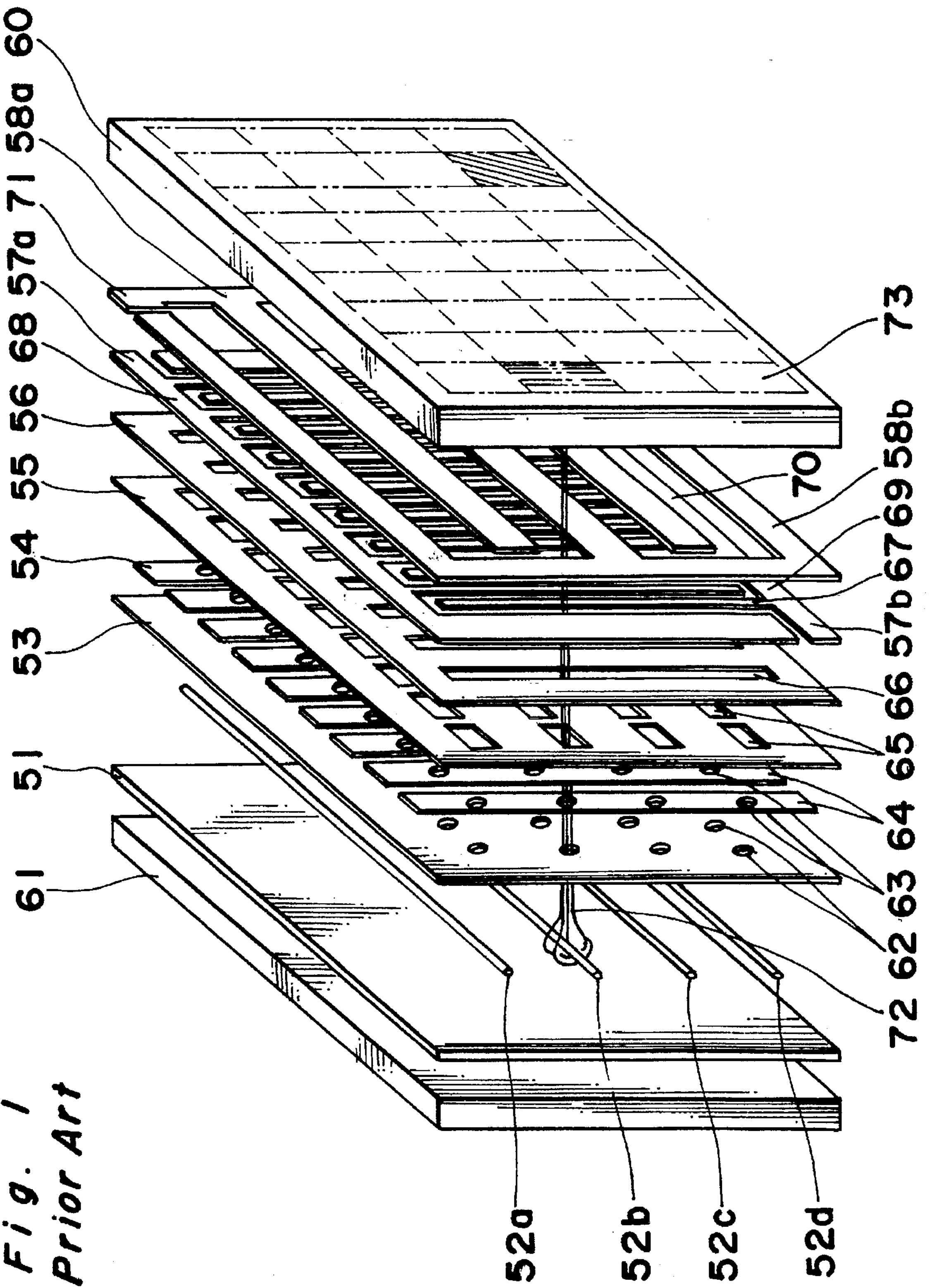
Fig. 1 Prior Art
FIG. 1 is an exploded perspective view showing the basic construction of an image display element.
Figure 2A:
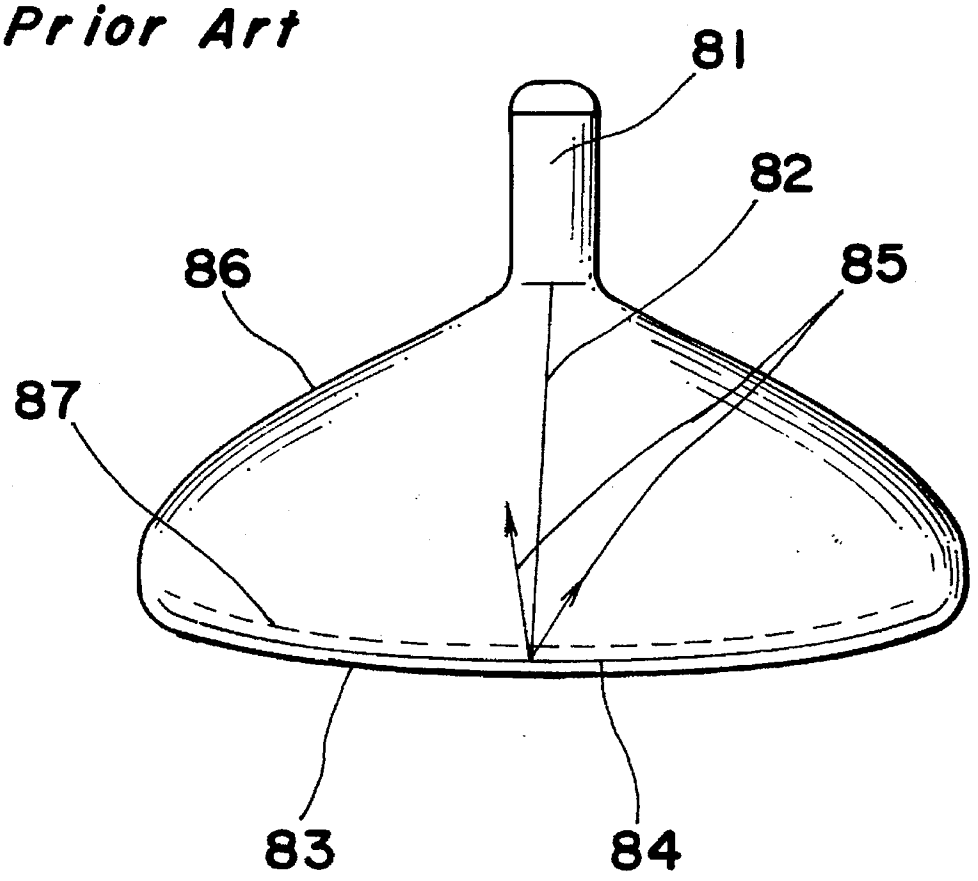
Fig. 2(A) Prior Art
FIGS. 2A and 2B are views showing the inner construction of a Braun tube and an image display element.
Figure 2B:
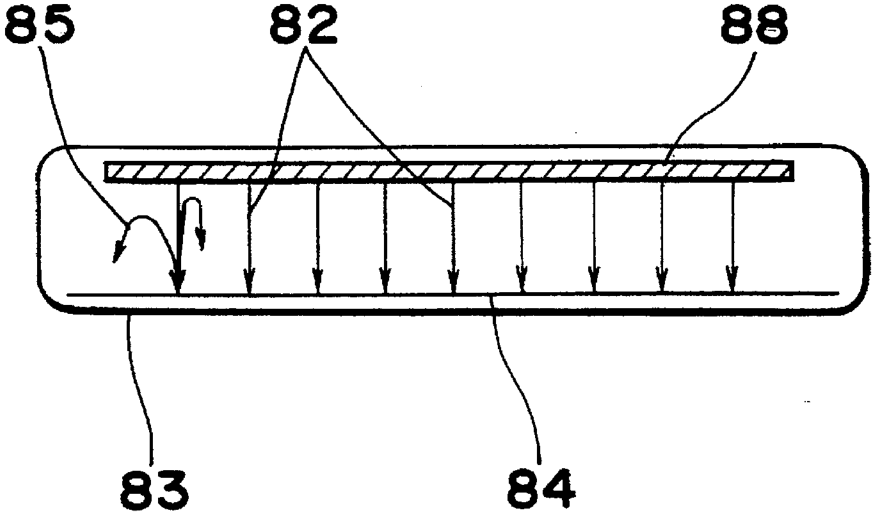
Fig. 2(B) Prior Art

Before the description of the present invention proceeds, it is to be noted that like parts are designated by like reference numerals throughout the accompanying drawings.

One embodiment of the image display element of the present invention will be described hereinafter with reference to the drawings.

Figure 3:
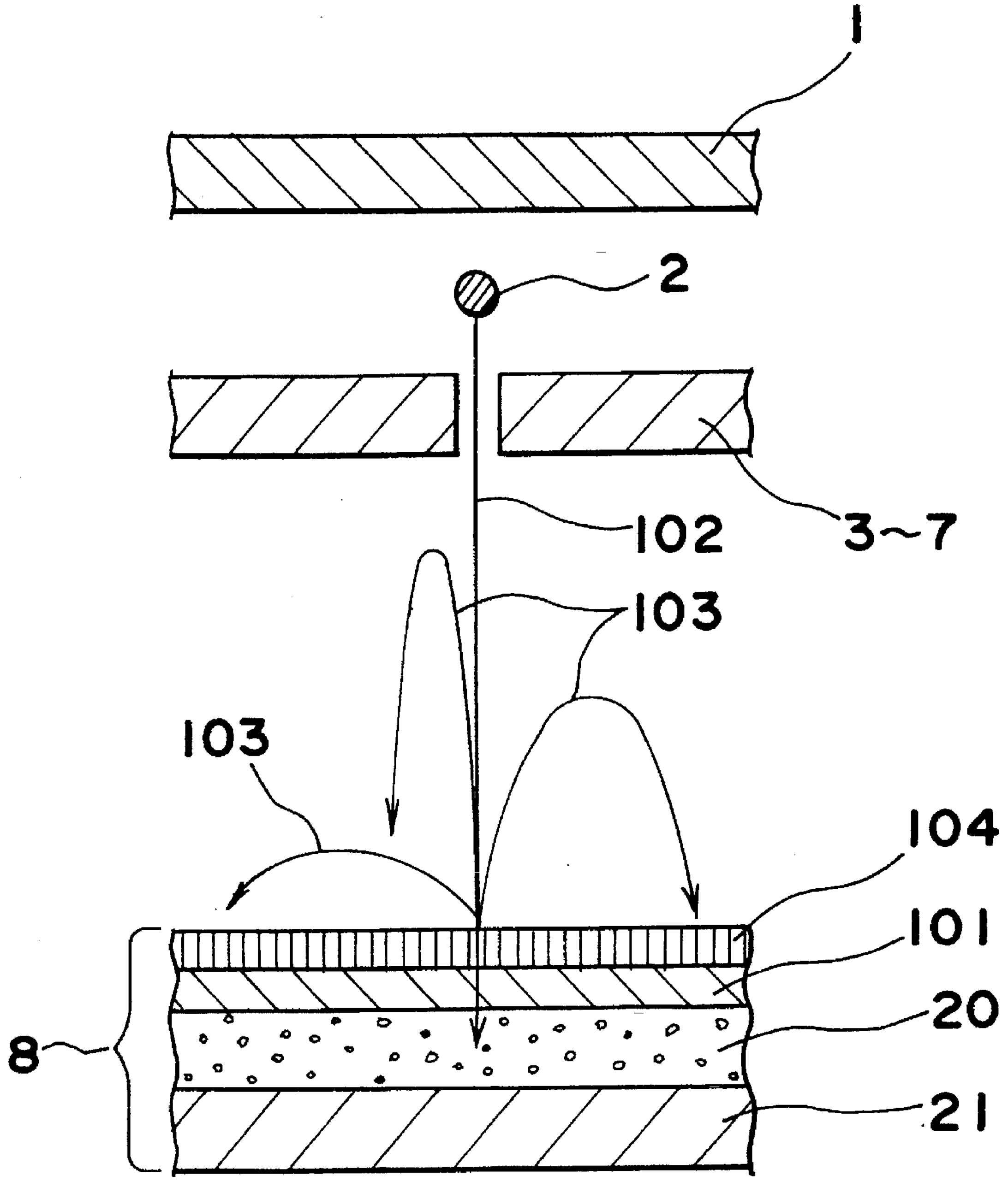
FIG. 3 is a schematic side sectional view of an image display element according to an embodiment of the present invention.
Figure 4:
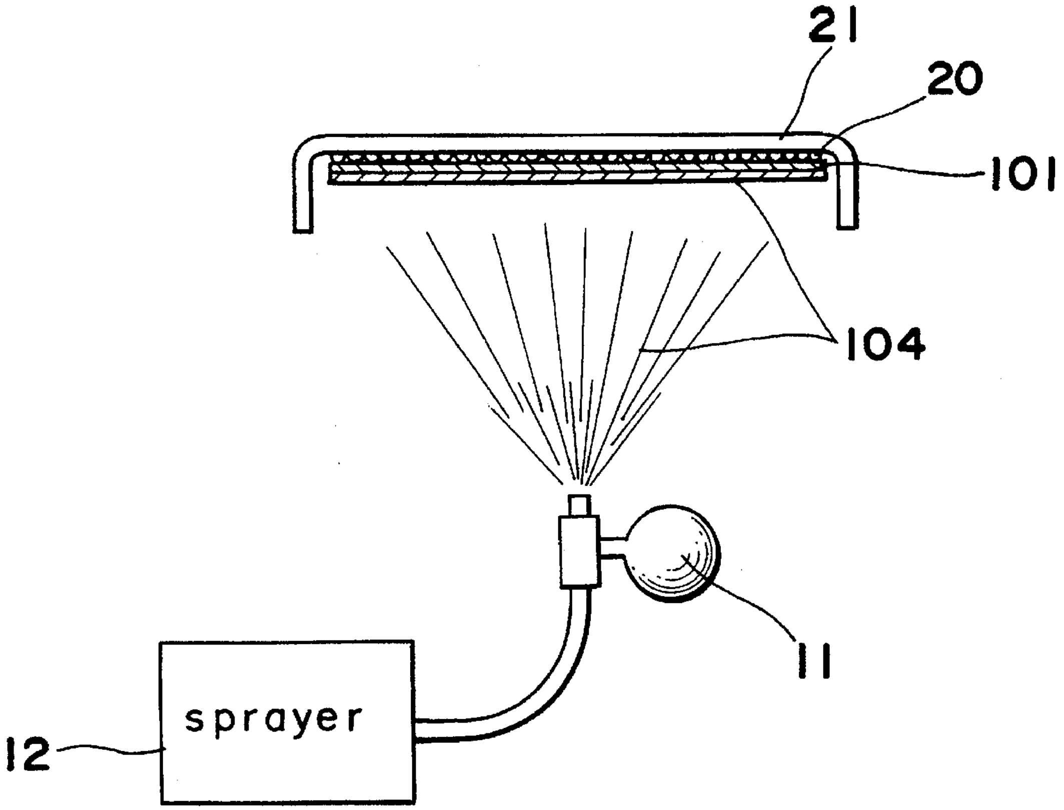
FIG. 4 is a diagram showing one example of a carbon layer forming method.
Figure 5:
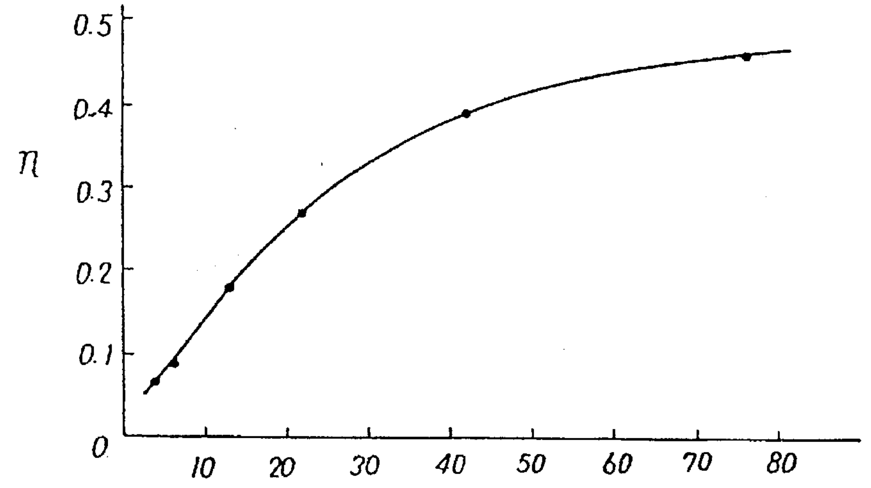
FIG. 5 is a graph showing the generation factor of the rearward dispersed electrons with respect to the atomic number of the material of a target to which the electron beams become incident.

FIG. 3 is a schematic side sectional view of an image display element of the present invention. FIG. 4 is a diagram showing a forming method of a carbon layer. FIG. 5 is a graph showing the relationship of the generation factor (rearward dispersion coefficient) n of the rearward dispersed electrons with respect to the atomic number Z of the material of the target to which the electron beams become incident.

In FIG. 3, reference numeral I designates a back electrode equivalent to the back electrode 51 of FIG. 1, reference numeral 2 designates a linear cathode equivalent to the linear cathode 52 of FIG. 1, reference numerals 3 through 7 designate electrode elements equivalent to a beam forwarding electrode 53, a signal electrode 54, a focusing electrode 55, and horizontal vertical deflecting electrodes 57, 58 of FIG. 1, and reference numeral 8 designates a screen plate equivalent to a screen 73 of FIG. 1, the screen plate being composed of a glass plate 21, a phosphor layer 20 to be positioned on it, a metal back (aluminum layer) 101 provided on the phosphor 20, and a carbon layer 104 provided on the metal back 101. Reference numeral 102 designates electron beams generated from the linear cathode 2, and reference numeral 103 designates rearward dispersed electrons (secondary electrons).

As clear from FIG. 5, the rearward dispersed electrons 103 are 18% of the incident electron beams 102 in the case of aluminum (atomic number 13) normally used in the metal back 101. The rearward dispersed electrons 103 become 9% of the incident electron beams 102 in the case of carbon (atomic number 6). If a carbon layer 104 is formed on the metal back 101, the generation of the rearward dispersed electrons 103 may be reduced by half, and the contrast ratio can be improved by a factor of two.

FIG. 4 is a diagram of the carbon layer forming method. In the drawing, it is assumed that the phosphor 20 and the metal back 101 are already formed on the internal face of the glass plate 21. Carbon liquid 11 with powdered carbon dissolved in a solvent such as water, alcohol or the like is put into a sprayer 12, is sprayed onto the metal back 101 of the glass plate 21 so as to form the carbon layer 104. Thereafter, it is fired at approximately 450° C. and the face plate as a whole is completed. Here the thickness of the carbon layer 104 is adjusted by the spraying time or the spraying amount of the sprayer 12. When the carbon layer 104 is too thick, the passing ratio of the electron beams is lowered, thus reducing the brilliance. Therefore, a carbon layer of approximately 0.3 through 0.4 thermal absorption factor is formed at this time.

Figure 6:
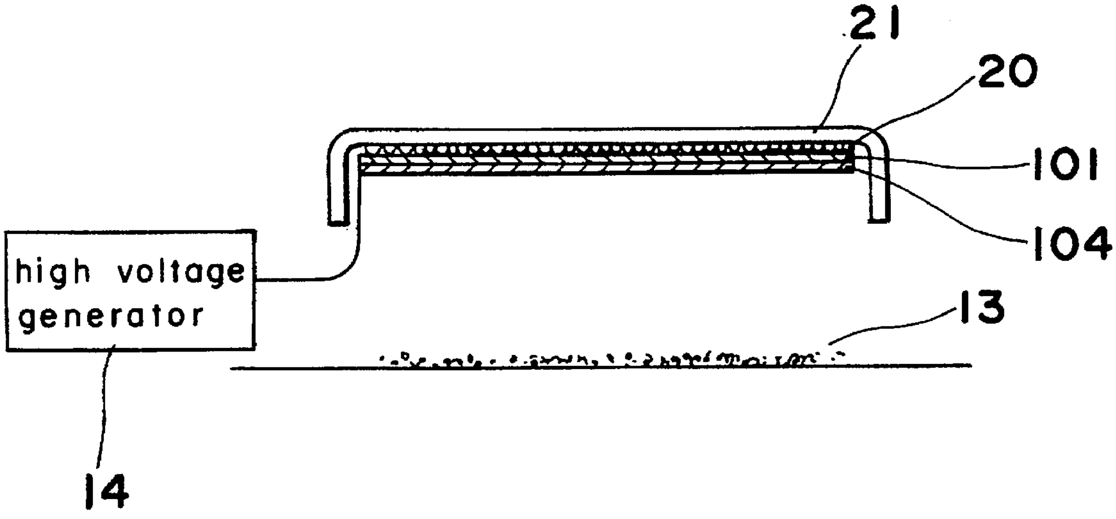
FIG. 6 is a diagram showing another example of the carbon layer forming method.

FIG. 6 is a diagram of the carbon layer forming method according to a second embodiment of the image display element of the present invention.

It is assumed that the phosphor 20 and the metal back 101 are already formed of the internal face of the glass plate 21. A sufficient amount of carbon powder 13 is prepared and a glass plate 21 is placed above it with the metal back 101 being directed downwards. A high voltage is applied by a high tension generator 14 connected with the metal back 101, and the carbon layer 104 is formed on the metal back 101 by electric evaporation. Therefore, it is fired at approximately 450° C. and the face plate as a whole is completed.

When the carbon layer is formed by the electric evaporation, a more uniform carbon layer can be obtained than by the spraying as in the first embodiment. When the high-tension voltage applied to the metal back on the face is comparatively low (15 KV or lower), a face where uneven brilliance is not caused can be formed.

A third embodiment of the present invention will be described hereinafter. FIGS. 8A to 8D are schematic sectional views showing an example of a method for forming a carbon layer employing contact pressure transferring for a picture image display element according to the present invention. Although the temperature of 450° C. is employed for calcination in the embodiment, the carbon layer can be formed so as to be stable only when the temperature of calcination is less than 500° C. and more than 250° C. for evaporating the silicone resin.

Figure 8:
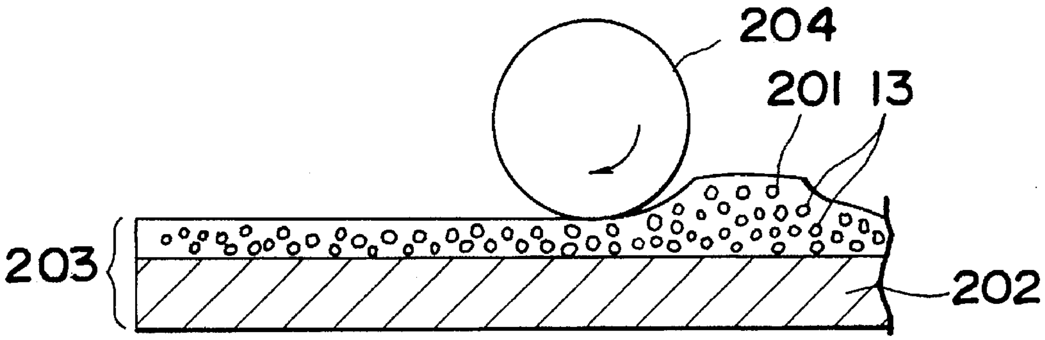
FIGS. 8A–8D are schematic sectional views showing a method of forming a carbon layer.
Figure 8:
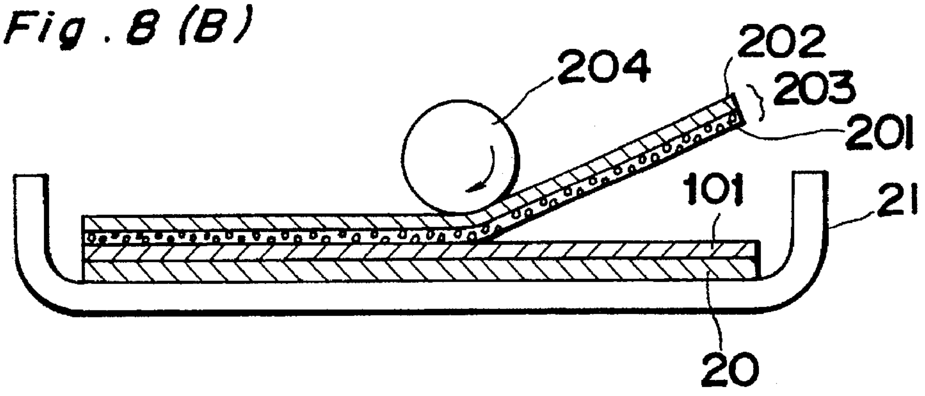
Figure 8:
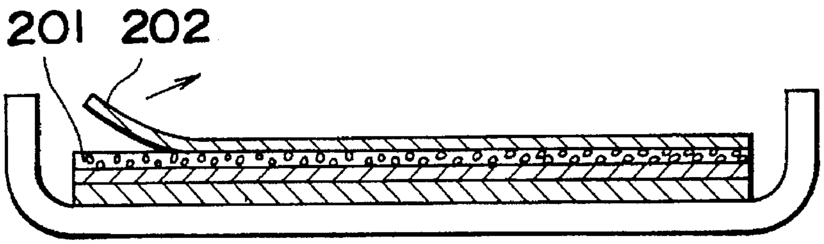
Figure 8:
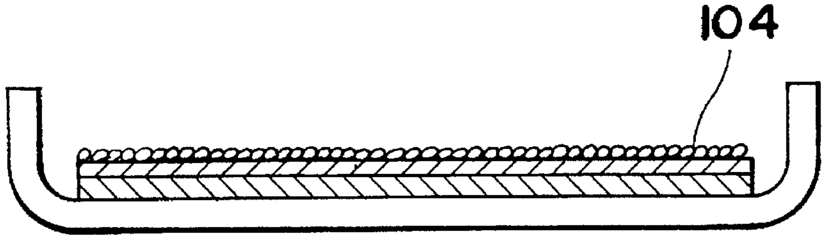

In FIG. 8A, a silicone resin 201 including carbon powder, which is mixed with carbon powder 13 in advance and is a kind of liquid having the properties of good adhesion and excellent pyrolysis, is adapted to stretch evenly over several microns thickness by means of a roller 204 pressed with a certain stress onto a supporter 202 having mold release characteristics, for instance, a resin film of several tens of microns in thickness. A sheet 203 results, providing the carbon layer manufactured by the above process, and is turned over as shown in FIG. 8B. The sheet 203 is then transferred with contact pressure by the roller 204 pressed with a certain stress onto a glass plate 21 formed with an aluminum layer 101 and a fluorescent substance 20 thereon. Then, by releasing the supporter 202 from the sheet 203, the silicone resin 201 including carbon powder remains as shown in FIG. 8C. Thereafter, the silicone resin 201 including carbon powder is calcined at the temperature of 450 degrees C. to evaporate the silicone resin, and provides a carbon layer 104 evenly remaining, only with carbon powder 13, as shown in FIG. 8D.

A fourth embodiment of the present invention will be described hereinafter. FIGS. 9A to 9E are schematic sectional views showing an example of a method for forming a metal back layer and a carbon layer by the employment of contact pressure transfer for a picture image display element according to the present invention.

Figure 9:
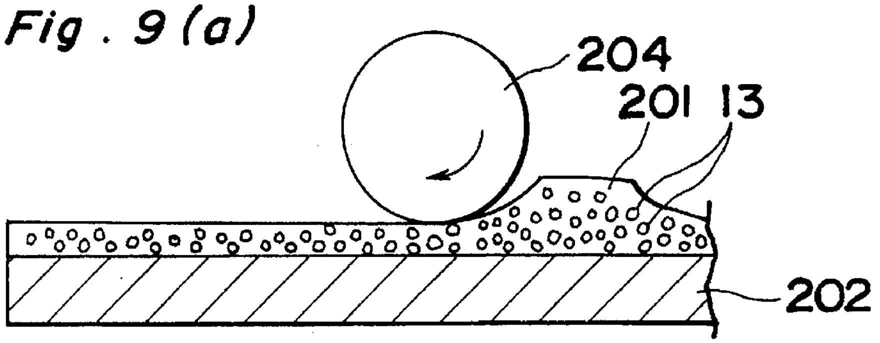
FIGS. 9A–9E are schematic sectional views showing a method of forming a carbon layer on the metal back.
Figure 9:
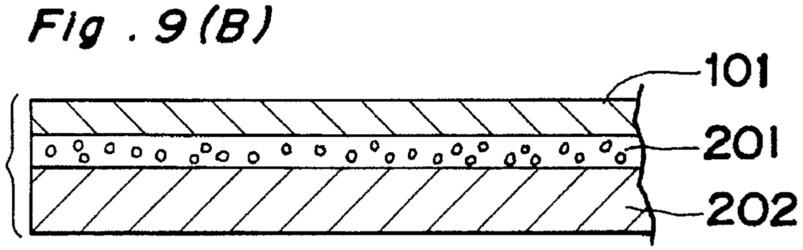
Figure 9:
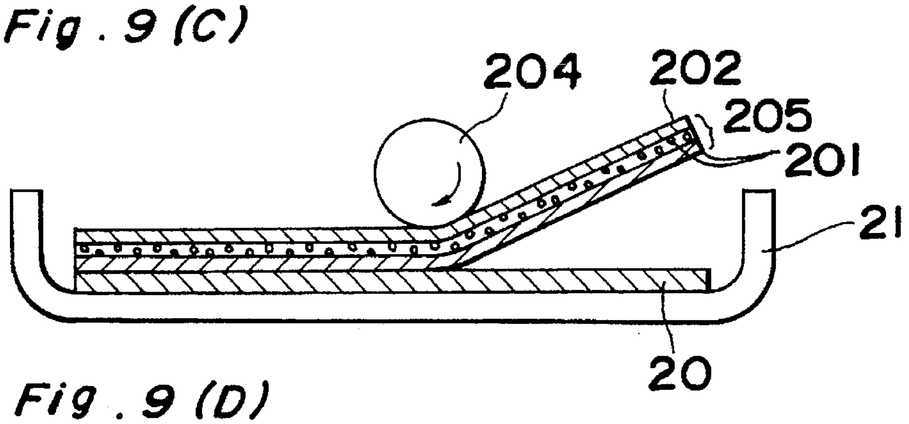
Figure 9:
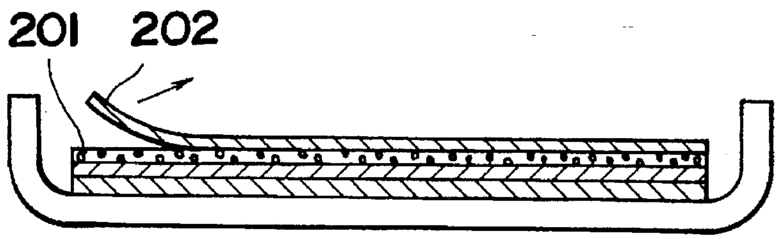
Figure 9:
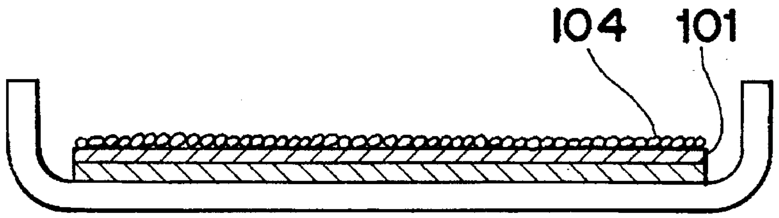

In FIG. 9A, a silicone resin 201 including carbon powder, which is mixed with carbon powder 13 in advance, and is a kind of liquid having the properties of good adhesion and excellent pyrolysis, is adapted to stretch evenly over several microns of thickness by means of a roller 204 pressed with a certain stress onto a supporter 202 having mold release characteristics, for instance, a resin film of several tens of microns in thickness. In addition, an aluminum layer 101 is formed onto the silicone resin 201 by means of electric deposition in a known manner, as shown in FIG. 9B. A sheet 205 providing the carbon layer 201 and metal back layer 101 manufactured by the above process is turned over, as shown in FIG. 9C, and is transferred by contact pressure by the roller 204 being pressed with a certain stress onto a glass plate 21 formed with fluorescent substance 20 thereon in advance. Then, by releasing the supporter 202 from the sheet 205, there remains the silicone resin 201 including carbon powder and the aluminum layer 101, as shown in FIG. 9D. Thereafter, the silicone resin including carbon powder and aluminum layer 101 are calcined at the temperature of 450 degrees C. to evaporate the silicone resin, providing one carbon layer 104 remaining with only carbon powder 13 and the aluminum layer 101 as shown in FIG. 9E.

By the formation of the carbon layer through the above described transferring operation, the carbon layer carrying sheet can be prepared in advance. The pressure adherence transferring operation has only to be effected at the face plate completing step. Simplication of the step may be effected.

Although carbon is used in the present embodiment, an equal effect may be obtained if a normal temperature solid material which has a smaller atomic number than aluminum is used.

Figure 7:
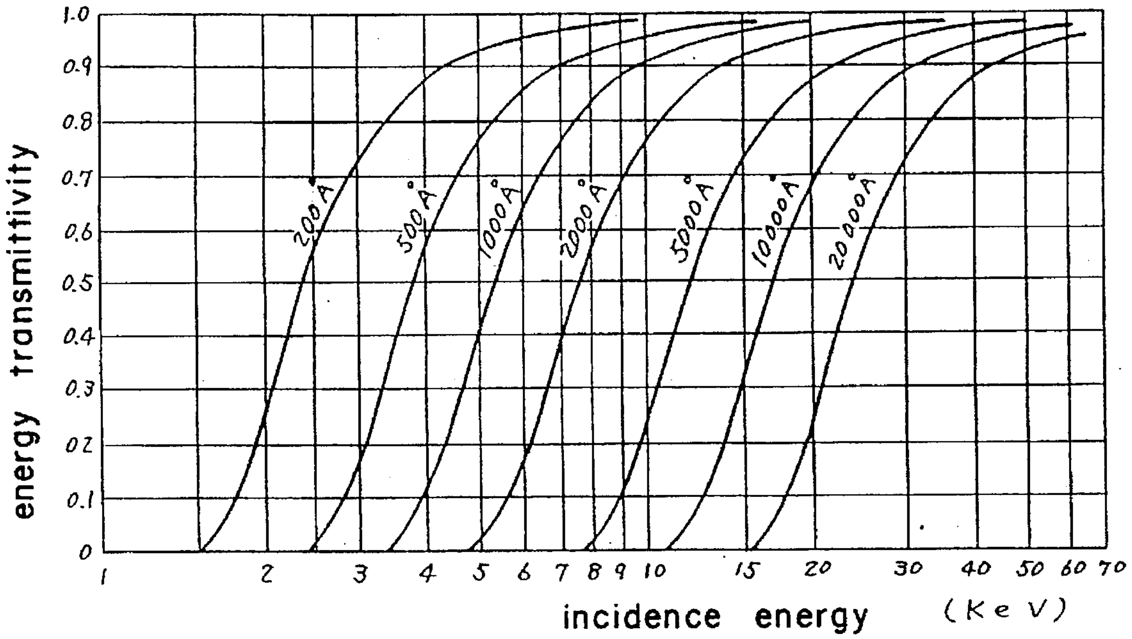
FIG. 7 is a graph showing the relationship of the electron energy to the energy transmission factor with the thickness of the metal back as a parameter.

A method of setting the thickness of the metal back 101 will be described with reference to the drawings. FIG. 7 is a graph showing the relation of the electron incident energy to the energy transmission factor when the thickness of the metal back 101 is varied.

It is assumed that the metal back 101 is 1000 Å in thickness with an electric potential of 10 KV being applied to it in FIG. 3. In this case, the electron beams 102 generated from the linear cathode 2 (potential 0 V) are accelerated by the potential gradient with respect to the metal back 101, and are applied to the metal back with an incident energy of 10 KeV. When the target is aluminum, 18% of the incident beams are dispersed rearwards as rearward dispersed electrons 103, and the energies of the rearward dispersed electrons 103 become approximately 6 KeV (approximately 60% of the incident energies). The secondary electrons dispersed rearwards rush toward the metal back again due to the energies of approximately 6 keV by the above described potential gradient. When the thickness of the metal back 101 is 1000 Å, the energy transmission factor of the incident electrons (10 keV) is 92%, and the energy transmission factor of the rearward dispersed electrons (6 keV) is 64%. Therefore, it is undesirable that the brilliance be extremely high, the transmission factor of the rearward dispersed electrons also be high, and the contrast deteriorated. It is assumed that the thickness of the metal back is 2000 Å, the energy transmission factors of the incident electrons and the rearward dispersed electrons are respectively 77% and 16%. When the thickness of the metal back 101 changes from 1000 Å to 2000 Å the energy transmission factor (which is proportional to brilliance) of the incident electrons changes from 92% to 77% and the brilliance is also lowered somewhat. But the energy transmission factor (proportional to halation) of the rearward dispersed electrons is extremely reduced from 64% to 16%. Therefore, the brilliance is satisfactory and the contrast is also extremely good. But when the thickness of the metal back increases greatly, the brilliance is lowered greatly, so that the proper thickness is important. By experiment, it has been found that balancing is provided in the brilliance and the contrast if the energy transmission factor of the rearward dispersed electrons is 30% or lower. On the basis of this, the thickness should be 2000 Å or more and 3500 Å or lower when the voltage of the metal back is 10 KV. In the case of 9 kV, it should be 1500 Å or more and 2000 Å or lower.

As described hereinabove, the halation may be considerably reduced with some brilliance reduction by the adjustment of the thickness.

Although the present invention has been fully described by way of example with reference to the accompanying drawings, it is to be noted here that various changes and modifications will be apparent to those skilled in the art. Therefore, unless otherwise such changes and modification depart from the scope of the present invention, they should be construed as included therein.

What is claimed is:

1. A method of making an image display element for use with a predetermined supply voltage, comprising:

forming a silicone resin layer having carbon powder therein on a supporter having mold release characteristics;

forming a metal back layer on the silicone resin layer by electric deposition of metal on the silicone resin layer to form a sheet comprising the supporter, the silicone resin layer and the metal back layer;

securing the sheet on a vacuum cell, the vacuum cell comprising a face plate and a back housing, and having therein a cathode, a control electrode for controlling electron beams projected from the cathode and a fluorescent layer on the face plate for generating light by projecting the electron beams, and said step of securing the sheet comprising pressing the sheet onto the fluorescent layer with the metal back layer against the fluorescent layer;

releasing the supporter from the sheet, leaving the metal back layer on the fluorescent layer in order to project the light of the fluorescent layer forward by the effect of specular gloss, and leaving the silicone resin layer on the metal back layer; and evaporating the silicone resin of the silicone resin layer by calcining the silicone resin layer, thereby leaving the carbon powder as a carbon layer on the metal back layer in order to reduce the generation of backwardly scattered light;

wherein said step of forming a metal back layer comprises electrically depositing the metal to a thickness determined in relation to the predetermined supply voltage such that the energy transmission factor of the reflected and dispersed electrons on the image display element is less than 30%.

2. The method of claim 1, wherein said step of forming a silicone resin layer comprises pressing silicone resin having the carbon powder therein onto the supporter with a roller.

3. The method of claim 1, wherein said step of securing the sheet further comprises pressing the sheet onto the fluorescent layer with a roller.

4. The method of claim 1, wherein said step of forming the metal back layer further comprises depositing the metal as aluminum to a thickness of 2000 Å to 3500 Å for a predetermined supply voltage of 10 Kv.

5. The method of claim 4, wherein said step of forming comprises depositing the aluminum to a thickness of 2000 Å such that the energy transmission factor of the reflected and dispersed electrons on the image display element is 16% and the energy transmission factor of the incident electrons on the image display element is 77%.

6. The method of claim 1, wherein said step of forming the metal back layer further comprises depositing the metal as aluminum to a thickness of 1500 Å to 2000 Å for a predetermined supply voltage of 9 Kv.

7. The method of claim 1, wherein said step of forming the metal back layer comprises depositing the metal as aluminum to a thickness of 1500 Å to 3500 Å.

8. The method of claim 1, wherein said step of forming comprises depositing aluminum as the metal back layer.

9. A method of making an image display element for use with a predetermined supply voltage, comprising:

forming a silicone resin layer having carbon powder therein on a supporter having mold release characteristics;

forming a metal back layer on the silicone resin layer by electric deposition of metal on the silicone resin layer to form a sheet comprising the supporter, the silicone resin layer and the metal back layer;

pressing the sheet onto a fluorescent layer on a flat face plate with the metal back layer against the fluorescent layer;

releasing the supporter from the sheet, leaving the metal back layer on the fluorescent layer in order to project the light of the fluorescent layer forward by the effect of specular gloss, and leaving the silicone resin layer on the metal back layer;

evaporating the silicone resin of the silicone resin layer by calcining the silicone resin layer, thereby leaving the carbon powder as a carbon layer on the metal back layer in order to reduce the generation of backwardly scattered light;

wherein said step of forming a metal back layer comprises electrically depositing the metal to a thickness determined in relation to the predetermined supply voltage such that the energy transmission factor of the reflected and dispersed electrons on the image display element is less than 30%; and assembling the flat face plate having the fluorescent layer, the metal back layer and the carbon layer thereon with a back cell facing the carbon layer, and a back electrode, a linear cathode and a plurality of electrode elements between the back cell and the face plate.

10. The method of claim 9, wherein said step of forming a silicone resin layer comprises pressing silicone resin having the carbon powder therein onto the supporter with a roller.

11. The method of claim 9, wherein said step of securing the sheet further comprises pressing the sheet onto the fluorescent layer with a roller.

12. The method of claim 9, wherein said step of forming the metal back layer further comprises depositing the metal as aluminum to a thickness of 2000 Å to 3500 Å for a predetermined supply voltage of 10 Kv.

13. The method of claim 12, wherein said step of forming comprises depositing the aluminum to a thickness of 2000 Å such that the energy transmission factor of the reflected and dispersed electrons on the image display element is 16% and the energy transmission factor of the incident electrons on the image display element is 77%.

14. The method of claim 9, wherein said step of forming the metal back layer further comprises depositing the metal as aluminum to a thickness of 1500 Å to 2000 Å for a predetermined supply voltage of 9 Kv.

15. The method of claim 9, wherein said step of forming the metal back layer comprises depositing the metal as aluminum to a thickness of 1500 Å to 3500 Å.

16. The method of claim 9, wherein said step of forming comprises depositing aluminum as the metal back layer.

17. The method of claim 9, wherein the plurality of electrode elements in said step of assembling include a beam forwarding electrode, a signal electrode, a focusing electrode and horizontal and vertical deflection electrodes.

18. The method of claim 9, wherein said step of forming the metal back layer further comprises depositing the metal as aluminum to a thickness selected from the group consisting of 1500 Å to 2000 Å for a predetermined supply voltage of 9 Kv and 2000 Å to 3500 Å for a predetermined supply voltage of 10 Kv.

* * * * *